Patented Dec. 5, 1944

2,364,074

UNITED STATES PATENT OFFICE 2,364,074

CARBONAMIDINE DERIVATIVES

Madison Hunt, Claymont, and James E. Kirby, Wilmington, Del., assignors to E. I. du Pont de Nemours & Company, Wilmington, Del., a corporation of Delaware No Drawing. Application October 13, 1942, Serial No. 461,890

3 Claims. (Cl. 260—564)

This invention relates to new derivatives of carbon amidine which are particularly adaptable for use as disinfectants and to processes for their manufacture.

As is well known the numerous disinfectants in use today are subject to the disadvantage that they are very restricted in their field of use. This limitation on the employment of these compounds is due to the fact that many of them lose all or most of their activity in the presence of blood, blood serum and other natural protein materials. An additional disadvantage of a large number of these compounds is that they contain mercury or other heavy metals which produce undesirable side reactions with many sensitive individuals. An additional reason for this relative restriction on the field of use of these compounds is the fact that they are of value only in the treatment of certain types of bacteria or other organisms.

It is an object of this invention to overcome the foregoing disadvantages of the prior art and numerous other disadvantages which directly or indirectly result therefrom. A further object is to produce a new class of carbonamidine compounds which may be employed for a multiplicity of purposes in addition to their use as disinfectants. An additional object is to devise new methods of producing carbonamidine compounds. Further objects will become apparent from a consideration of the following description and claims.

These objects are attained in accordance with the present invention which comprises the production of carbonamidine derivatives having the following general formula:

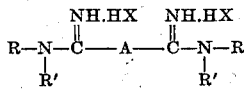

wherein A is a bivalent radical containing a straight chain of at least four atoms between the amidine groups; R is a monovalent radical containing at least six carbon atoms; R' is hydrogen or a monovalent radical containing less than six carbon atoms; and X is an anion.

In a more restricted sense this invention is concerned with the production of compounds having the aforesaid general formula wherein A represents a bivalent hydrocarbon radical of at least four carbon atoms in a chain; R represents a monovalent hydrocarbon radical of at least six carbon atoms; R' represents hydrogen or a monovalent hydrocarbon radical of less than six carbon atoms; and X represents an anion of an acid having a dissociation constant greater than vention pertains to compounds of this latter type wherein the radicals represented by A, R and R' are unsubstituted and R and R' are aliphatic groups. In a still more restricted sense this invention pertains to compounds having particular value as disinfectants which conform to the following general formula:

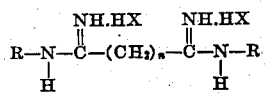

wherein R is a straight chain, unsubstituted, saturated alkyl group of ten to eighteen carbon atoms; $n$ is an integer from six to ten; and X is an anion of a strong inorganic acid having a dissociation constant greater than $1 \times 10^{-3}$.

In its preferred embodiment this invention pertains to compounds such as

N,N'-didodecyl-sebacamidine dihydrochloride
N,N'-didodecyl-adipamidine dihydrochloride
N,N'-didecylsebacamidine dihydrochloride and processes for their production and use.

As will be more fully mentioned hereafter, the majority of products embraced within the present invention are acid addition salts of diamidines in which the two nitrogen-bearing carbon atoms of the amidine groups are separated by a saturated, bivalent hydrocarbon grouping of at least four carbon atoms in a chain. These compounds are furthermore characterized by the substitution on each of the non-imino nitrogen atoms of the amidine groups of an aliphatic hydrocarbon radical of six or more carbon atoms and in addition either hydrogen or an alkyl group of less than six carbon atoms. The remaining i. e. iminio nitrogen atom of each amidine grouping has attached thereto a hydrogen atom.

These products conform to the general formulas previously given herein. They may be obtained by reacting a diiminoether salt in which the iminoether groupings are separated by the group previously represented by A, with an amine having substituted thereon at least one hydrogen atom directly attached to the nitrogen atom. The reaction may be carried out in any suitable solvent which is removed from the reaction product upon completion of the reaction.

For example, the N,N'-dialkylalkanedicarbonamidines are readily prepared by mixing in a suitable anhydrous solvents such as methanol or ethanol one equivalent of a bis-iminoether salt such as adiponitrile dimethyldiiminoether dihydrochloride with two equivalents of a primary or or N-methyldodecylamine. The reaction occurs readily at room temperature, and after a few hours standing at 25–30° the solution is concentrated in vacuo to remove the solvent. The residue is washed with ether and dried in vacuo over phosphorus pentoxide. The product obtained is a white hygroscopic solid, soluble in water and in alcohol but insoluble in ether, petroleum ether, benzene, and chloroform.

The free amidine base may be obtained from the salt prepared as described above by neutralizing a solution of the salt in water or in alcohol with a strong base such as sodium hydroxide, potassium hydroxide, or sodium ethylate.

Bis-iminoether salts are prepared from the corresponding dinitriles by the action of hydrochloric acid in the presence of alcohols essentially as described by Kawai, Hosono, Shiinami, and Shunych, Sci. Papers Inst. of Phys-Chem. Res. (Tokio) 16, Nos. 306–9, pp. 9–16 (1931). The preparation of bis-iminoether salts is also described in a Hunt and Kirby patent application, Serial No. 350,108, filed August 2, 1940, now Patent No. 2,310,789. Amines employed in this reaction may be prepared by any of the classical methods of synthesis of primary and secondary amines. Suitable solvents include any of the various commercial grades of anhydrous alcohols.

The invention may be more readily understood by a consideration of the following illustrative examples wherein the quantities are stated in parts by weight:

EXAMPLE I

*N,N'-didecylsebacamidine dihydrochloride*

To a suspension of 30.1 parts of sebaconitrile dimethyl diiminoether dihydrochloride in 200 parts of dry methane is added 34.5 parts of normal decylamine. The mixture is allowed to stand 24 hours at 20–30° and is then subjected to concentration in vacuo. The thick viscous product is dried in vacuo to remove the last traces of solvent. The product is a soft, white, hygroscopic solid. The yield is practically quantitative. The product is soluble in water and in alcohol, but insoluble in ether, petroleum ether, and benzene. Anal. calc'd for $C_{30}H_{62}N_4.2HCl$: N, 10.17%; Cl, 12.85%. Found: N, 9.48%; Cl, 11.66%.

The free amidine base is readily obtained from the salt by treating a solution of 55.1 parts of N,N'-didecylsebacamidine dihydrochloride in 100 parts of water with 10 parts of sodium hydroxide, also dissolved in 100 parts of water, at 0°. The mixture is extracted with ether or with benzene, and the free amidine is isolated by removal of the solvent. The amidine is a thick viscous oily product, somewhat soluble in water, readily soluble in alcohol, and soluble in ether and benzene but insoluble in petroleum ether.

N,N'-didecylsebacamidine dihydrochloride when tested for bactericidal activity against *Staphylococcus aureus* by the standard F. D. A. (Food & Drug Administration) method kills the organisms in 5 minutes in a dilution of 1:50,000. The compound when tested by the same method but in the presence of 10% of horse blood serum, shows a killing dilution of 1:30,000 in 10 minutes. The same test carried out in the presence of 10% human blood reveals that the compound kills *Staphylococcus aureus* in dilution of 1:5,000 in 10 minutes.

When tested for bacteriostatic activity by standard tests described in elementary texts on bacteriology, this compound inhibits the growth of *Staphylococcus aureus* at dilutions of 1:200,000,

EXAMPLE II

*N,N'-dicyclohexylsebacamidine dihydrochloride*

To a suspension of 21.7 parts of sebaconitrile dimethyl diiminoether dihydrochloride in 150 parts of methanol is added 30 parts of cyclohexylamine. The addition is carried out at 20–30°, and the mixture is allowed to stand 12 hours at this temperature. The methanol is then removed in vacuo and the crystalline residue is recrystallized from a mixture of equal parts of ethanol and ethyl acetate. The compound is a white crystalline solid, melting at 143°. The yield is 25 parts of recrystallized product. The compound is soluble in water and in ethyl alcohol but insoluble in benzene, ether, and petroleum ether. Anal. calc'd for $C_{22}H_{24}N_4.2HCl$: N, 12.90. Found: N, 12.61.

N,N'-dicyclohexyl sebacamidine dihydrochloride when tested for bacteriostatic activity by the agar cup plate method (described in copending application Serial No. 405,555, filed August 5, 1941, by John F. Lontz) showed the following:

| Compositions of media | Zones of growth inhibition in mm. with various dilutions of the compound | | | |
| --- | --- | --- | --- | --- |
| | 1–20 | 1–100 | 1–1000 | 1–5000 |
| Agar+10% human blood | [1]7.0+8.0 | 6.0+6.0 | 4.5+3.0 | 4.0+3.0 |
| Agar+50% human blood | 8.0 | 6.0+4.0 | 4.0+3.0 | 3.0 |

[1] Refers to a 7 mm. zone of complete inhibition surrounded by an 8 mm. zone of incomplete inhibition.

EXAMPLE III

*N,N'-dihexyladipamidine dihydrochloride*

To a suspension of 24.5 parts of adiponitrile dimethyl diiminoether dihydrochloride in 200 parts of anhydrous methanol is added 22.2 parts of n-hexylamine. The reaction mixture is allowed to stand at 20–30° for 96 hours. The methanol is removed in vacuo to yield 38 parts of a light straw colored syrup which is soluble in alcohol and in water but is insoluble in ether and benzene. Anal. calc'd for $C_{18}H_{38}N_4.2HCl$: Cl, 23.54. Found: Cl, 21.60.

EXAMPLE IV

*N,N'-didodecylsebacamidine dihydrochloride*

To a suspension of 30.1 parts of sebaconitrile dimethyl diiminoether dihydrochloride in 150 parts of anhydrous methanol is added 41 parts of n-dodecylamine at a temperature of 20–30°. The mixture is allowed to stand 48 hours at this temperature and is then concentrated to dryness in vacuo. The product is a crisp, white, hygroscopic solid, soluble in alcohol and in water but insoluble in ether and in benzene. The yield is 60 parts.

EXAMPLE V

*N,N'-dioctadecylsebacamidine dihydrochloride*

To a suspension of 30.1 parts of sebaconitrile dimethyl diiminoether dihydrochloride in 200 parts of absolute methanol is added a solution of 55.5 parts of n-octadecylamine in 100 parts of absolute methanol. The temperature is maintained at 20–30°, and the mixture is allowed to stand at this temperature for 96 hours. The methanol is then removed in vacuo and the residue recrystallized from ethyl acetate. The yield is 77 parts of a white, hygroscopic product, melting at 80° after one recrystallization from ethyl acetate. The product is soluble in water, warm ethyl acetate, and ethyl alcohol, and insoluble in ether and benzene. Anal. calc'd for $C_{46}H_{94}N_4.2HCl$: Cl, 9.16%. Found: Cl, 9.07%. This compound shows some bactericidal activity, being an effective bactericide at dilutions of 1–1000 when tested against *Staphylococcus aureus* by the standard F. D. A. (Food & Drug Administration) method. The compound is bacteriostatic at dilutions of 1–30,000. N,N'-dioctadecylsebacamidine dihydrochloride is relatively non-toxic, the minimum lethal dose for mice by the intraperitoneal route being 200 mg. per kilogram of body weight.

EXAMPLE VI

*N,N'-di-n-butyl-N,N'-di-n-decyl sebacamidine dihydrochloride*

To a suspension of 30 parts of sebaconitrile dimethyl diiminoether dihydrochloride in 200 parts of anhydrous methanol is added 42 parts of N-butyl-n-decylamine. The mixture is held at a temperature of 20–30° for 48 hours, and the product is filtered off and recrystallized from ethanol. The yield is 65 parts of a white, crystalline solid melting at 250–260° with decomposition. The product is almost insoluble in water, but is soluble in hot alcohol and insoluble in ether and benzene. Anal. calc'd for $C_{38}H_{78}N_4.2HCl$: N, 8.45. Found: N, 8.72.

It is to be understood that the foregoing examples are illustratively merely of a few of the many embodiments of this invention. They may be varied widely with respect to the individual reactants, the amounts thereof and the conditions of reaction without departing from the scope of the invention.

In the general formula for these products, previously given herein, the grouping represented by A may be cyclic, acyclic, straight chain, branched chain, saturated, unsaturated, substituted or unsubstituted. For optimum results over a wide range of conditions it is preferably a straight chain, unsubstituted, saturated, polymethylene grouping containing from 6–10 carbon atoms.

The group previously represented by R may likewise be cyclic, acyclic, straight chain, branched chain, saturated, unsaturated, substituted or unsubstituted. It is preferably a straight chain, unsubstituted, saturated alkyl group containing from 10–18 carbon atoms.

The group previously represented by R' may be either hydrogen or a straight chain, branched chain, substituted, unsubstituted, saturated or unsaturated hydrocarbon radical. For most satisfactory results it is usually hydrogen, although excellent results may also be obtained when it is a straight chain, unsubstituted, saturated, aliphatic group containing less than six carbon atoms.

As previously mentioned, the group represented by X is an anion of an acid, particularly an acid having a dissociation constant greater than $1\times 10^{-11}$. Specific suitable acids include lactic, tartaric, citric, acetic, caproic, stearic, carbonic, boric, chloroacetic and hydroxyacetic, etc. This anion is preferably derived from a strong inorganic acid of dissociation constant greater than $1\times 10^{-3}$, such as hydrochloric acid, sulfuric acid, phosphoric acid, hydrobromic acid, and the like.

Diiminoethers satisfactory for use may be represented as follows:

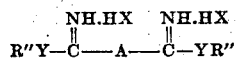

where A and X have the same significance as the correspondingly designated groups in the amidines previously referred to; Y is oxygen or sulfur, but preferably oxygen; and R" is a low molecular weight alkyl group of less than 5 carbon atoms and is preferably a methyl or ethyl group.

Specific suitable iminoether salts include the following: adiponitrile dimethyl diiminoether dihydrochloride, pimelonitrile dimethyl diiminoether dihydrobromide, suberonitrile dimethyl diiminoether sulfate, azeleonitrile dimethyl diiminoether acid phosphate, sebaconitrile dimethyl diiminoether dihydrochloride, 1,-12-dodecano dimethyl diiminoether dihydrochloride, hexadecane-1,16 dimethyl diiminoether dihydrochloride, eicosane-1,20 dimethyl diiminoether dihydrochloride, alpha-methyl adiponitrile dimethyl diiminoether dihydrochloride, alpha-ethyl sebaconitrile dimethyl diiminoether dihydrochloride, 1,4-cyclohexyldinitrile dimethyl diiminoether dihydrochloride, 1,4-dicyanomethyl cyclohexane dimethyl diiminoether dihydrochloride, SS'dimethylthiosebacamide hydrochloride, 2,3-dihydro-2-(di-beta-cyanoethyl) naphthalene dimethyl diiminoether dihydrochloride, etc.

Amines satisfactory for use may be represented as follows:

where R and R' have the same significance as R and R' in the previously described structural formula for the bifunctional amidines of this invention. Specific suitable amines are the following: n-hexylamine, n-heptylamine, n-octylamine, n-nonylamine, n-decylamine, n-undecylamine, n-dodecylamine, n-tetradecylamine, n-hexadecylamine, n-octadecylamine. N-ethyl decylamine, 2-methyldecylamine, cyclopentylamine, 2-methylcyclohexylamine, delta-3,4-hexenamine, N-cyclopentyldodecylamine, hexamethylene-imine, etc.

The reaction of the amine with the iminoether need not be carried out in the presence of a solvent. However, the preferred process involves the use of an anhydrous solvent in which both the amine and the iminoether salt are at least slightly soluble.

The amidine salts of this invention may be converted to the free bases by the addition of an amount of strong base (i. e., sodium hydroxide, potassium hydroxide, or sodium ethylate) equivalent to the acid anion of the salt. The free amidines are relatively insoluble in water and separate from aqueous solution when strong alkalies are added. For this reason an excess of alkali may be employed to free the amidine from its salt without hydrolyzing the amidine itself. The free amidine bases are readily redissolved in aqueous acids to yield water-soluble salts of the particular acid employed. Specific suitable acids are phosphoric, hydrochloric, sulfuric, hydrobromic, acetic, citric, carbonic, boric, chloracetic, hydroxyacetic, and the like.

This invention is intended to include both tautomeric forms of the amidines:

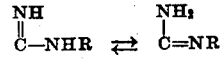

The relative amounts of the ingredients employed in carrying out the reaction are two mols of amine to one mol of diiminoether salt. An excess of amine over two mols for one of the iminoether salt may be employed without interfering with the process. The excess amine is recovered unchanged from the reaction mixture. Less than 2 mols of amine to one of iminoether salt leads, however, to incomplete reactions, and while some of the desired product is formed, it is contaminated with unreacted diiminoether and decomposition products thereof. Since the desired product is not readily separated from this mixture, it is generally advisable to use at least a 2:1 ratio of amine to diiminoether salt.

The temperature at which the reaction is conducted is maintained sufficiently low to avoid excessive decomposition of the iminoether salt and of the amidines formed. Thus, it is usually advisable to operate below 120° C. and preferably at 20–30° C. However, the reaction may be carried out at temperatures as low as −50° C.

The reaction may also be carried out at atmospheric, superatmospheric, or at subatmospheric pressures. However, atmospheric pressure is ordinarily the most convenient and consequently the preferred condition.

The products of this invention may be used as compositions for the control of economically and physiologically harmful lower forms of life. The compounds are especially useful for the control of harmful bacteria and molds. For these uses the product may be employed in solution in such solvents as water and alcohol. The products may also be used in admixture with other disinfecting agents, such as phenol, hexylresorcinol, various mercurial compounds and the like.

These products as previously mentioned are of particular value in disinfectant compositions. In this connection they are useful not only for the destruction of bacteria and other single celled organisms but also for the destruction of plant organisms such as molds, fungi, etc. They may be used in the form of solutions, tinctures, ointments, and the like. Likewise, they may be mixed with detergents, wetting agents, perfumes, etc. In addition to the foregoing uses they are also of value in the field of synthetic organic chemistry for use as such and in the preparation of additional compounds.

As many widely different embodiments of this invention may be made without departing from the spirit and scope thereof, it is to be understood that the invention is not limited to the specific embodiments thereof except as defined in the appended claims.

We claim:

1. Compounds having the following general formula:

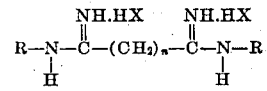

wherein R is a member selected from the group consisting of monovalent straight chain, saturated aliphatic hydrocarbon radicals of ten to eighteen carbon atoms; $n$ is an integer from six to ten; and X is an anion of a strong inorganic acid having a dissociation constant greater than $1 \times 10^{-3}$.

2. N,N′ - didodecyl - sebacodiamidine dihydrochloride.

3. N,N′ - didodecyl - adipamidine dihydrochloride.

MADISON HUNT.
JAMES E. KIRBY.